(12) United States Patent
Yamada et al.

(10) Patent No.: US 6,956,819 B1
(45) Date of Patent: Oct. 18, 2005

(54) METHOD, APPARATUS AND SYSTEM FOR EVALUATING QUALITY-OF-SERVICE IN PACKET SWITCHING NETWORK

(75) Inventors: Hideaki Yamada, Tokyo (JP);
Toshikane Oda, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/573,336

(22) Filed: May 18, 2000

(30) Foreign Application Priority Data

May 21, 1999 (JP) ............................................. 11/141406

(51) Int. Cl.[7] ................ H04J 1/16; H04J 3/14
(52) U.S. Cl. ................ 370/230; 370/238.1; 370/352; 370/395.21; 370/516
(58) Field of Search ................ 370/230, 238.1, 370/352, 395.21, 516, 232, 353, 354, 355, 356, 395.41, 395.52, 402, 522, 524

(56) References Cited

U.S. PATENT DOCUMENTS 6,292,466 B1 * 9/2001 Droz ........................... 370/232
6,469,657 B1 * 10/2002 Fox ............................. 342/147
6,529,499 B1 * 3/2003 Doshi et al. ................. 370/352

FOREIGN PATENT DOCUMENTS

JP          08-223610       8/1996
JP          10-164031       6/1998

OTHER PUBLICATIONS

Technical Report of IEICE, EA–92–86 (Dec. 1992); The Institute of Electronics, Information and Communication Engineers—Abstract—Yoiti Suzuki et al.

* cited by examiner

*Primary Examiner*—Seema S. Rao
*Assistant Examiner*—Inder Pal Mehra
(74) *Attorney, Agent, or Firm*—Armstrong, Kratz, Quintos Hanson & Brooks, LLP

(57) ABSTRACT

A method for evaluating quality-of-service in packet switching network uses an evaluation signal with a frequency component that changes continuously with a lapse of time. The evaluation signal is a time stretched pulse, and wherein the method includes a step of transmitting the time stretched pulse to at least one packet switching network, a step of receiving the time stretched pulse passed through the at least one packet switching network, and a step of comparing the transmitted time stretched pulse with the received time stretched pulse.

11 Claims, 10 Drawing Sheets

METHOD, APPARATUS AND SYSTEM FOR EVALUATING QUALITY-OF-SERVICE IN PACKET SWITCHING NETWORK

FIELD OF THE INVENTION

The present invention relates to a method, an apparatus and a system for evaluating quality-of-service in a packet switching network for example an IP (Internet Protocol) network.

DESCRIPTION OF THE RELATED ART

A conventional quality-of-service evaluation for a packet switching network is performed by counting the number of received packets with respect to the number of transmitted packets, or by comparing the state of a signal when it is transmitted with that of the signal when it is received. The state of the signal when transmitted can be obtained from the received packet header. The evaluation parameters thus obtained are for example a transmission delay, a transmission jitter that represents change in an interval of time between packet arrivals, a ratio of transmitting signal power, and a rate of packet loss.

However, such the evaluation parameters must be measured by individual methods, respectively. Moreover, in many cases, each unit used for monitoring the evaluation parameters must be directly connected to the packet network to be measured.

Therefore, in the packet switched network, it is required to provide a service quality evaluation method whereby evaluation parameters can be efficiently collected and a quality-of-service can be totally evaluated in consideration of evaluation parameters.

SUMMARY OF THE INVENTION

It is therefore an object of the present invention to provide a method, an apparatus and a system for evaluating quality-of-service in a packet switching network, whereby evaluation parameters can be efficiently extracted.

According to the present invention, a method for evaluating quality-of-service in a packet switching network uses an evaluation signal with a frequency component that changes continuously with a lapse of time.

It is preferred that the evaluation signal is a time stretched pulse (TSP), and that the method includes a step of transmitting the time stretched pulse to at least one packet switching network, a step of receiving the TSP passed through the at least one packet switching network, and a step of comparing the transmitted TSP with the received TSP.

It is also preferred that the comparing step includes transforming the transmitted TSP and the received TSP respectively by a fast-Fourier-transform processing to extract time-frequency component, and comparing the time-frequency component of the transmitted TSP with the time-frequency component of the received TSP to calculate a transmission delay and a transmission jitter in the packet switched network.

It is further preferred that the comparing step includes calculating a discontinuous spacing corresponding to absence of packets, of the frequency component of the received TSP, and calculating a pattern model that is generated by transmitted information loss. Since absence of packets can be measured, a transmitted information loss status in only the IP network can be measured even in the communication system in which both the telephone network and the IP network exist. Some patterns (random or burst loss patterns) that may produce frequency loss are modeled beforehand, and a final transmitted information loss pattern model is specified in accordance with the measured value and the degree of similarity of the models (for example, a correlation coefficient between patterns).

It is preferred that the comparing step includes modifying a resolution of the fast-Fourier-transform processing in order to compute the discontinuous spacing of the frequency component.

It is preferred that, in the comparing step, a rate of transmitted information loss is computed from the pattern model.

It is preferred that the method includes a quality-of-service evaluation step that applies parameters measured by the comparing step to a quality-of-service evaluation algorithm.

According to the present invention, an apparatus uses an evaluation signal with a frequency component that changes continuously with a lapse of time.

It is preferred that the evaluation signal is a TSP, and that the apparatus includes a unit for transmitting the TSP to at least one packet switching network, a unit for receiving the TSP passed through the at least one packet switching network, and a unit for comparing the transmitted TSP with the received TSP.

It is preferred that the comparing unit includes a unit for transforming the transmitted TSP and the received TSP respectively by a fast-Fourier-transform processing to extract time-frequency components, and a unit for comparing the time-frequency component of the transmitted TSP with the time-frequency component of the received TSP to calculate a transmission delay and a transmission jitter in the packet switched network.

It is preferred that the comparing unit includes a unit for calculating a discontinuous spacing corresponding to absence of packets, of the frequency component of the received TSP, and a unit for calculating a pattern model that is generated by the transmitted information loss.

It is preferred that the comparing unit includes a unit for modifying a resolution of the fast-Fourier-transform processing in order to compute the discontinuous spacing of the frequency component.

It is preferred that the comparing unit includes a unit for calculating a rate of transmitted information loss from the pattern model.

It is preferred that the apparatus further includes a quality-of-service evaluation unit that applies parameters measured by the comparing unit to a quality-of-service evaluation algorithm.

According to the present invention, a system for evaluating quality-of-service in a packet switching network includes an apparatus for transmitted TSP with a frequency component that changes continuously with a lapse of time, to at least one packet switching network, and an apparatus for regenerating the TSP recorded in memory, receiving the TSP passed through the at least one packet switching network, and comparing the regenerated TSP with the received TSP.

Further objects and advantages of the present invention will be apparent from the following description of the preferred embodiments of the invention as illustrated in the accompanying drawings.

DESCRIPTION OF THE PREFERRED EMBODIMENTS

According to this invention, an evaluation signal with a frequency component that changes continuously with a lapse of time is used for evaluating quality-of-service in packet switching network. The signal may be a time stretched pulse (TSP) for example. The TSP is used as a signal for deriving a transfer function of a sound field when a sound property is monitored.

Figure 7:
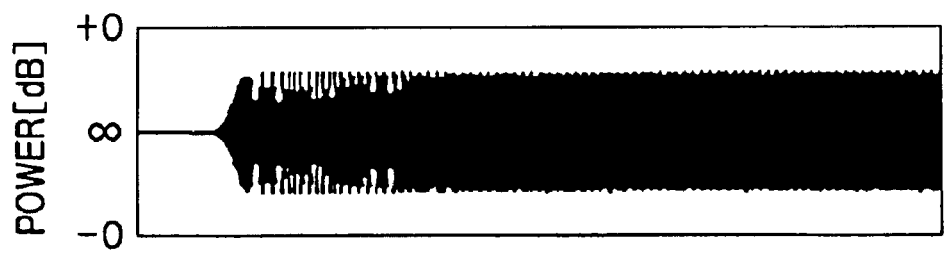
FIG. 7 is a graph of power spectral of the TSP with respect to lapse of time.
Figure 8:
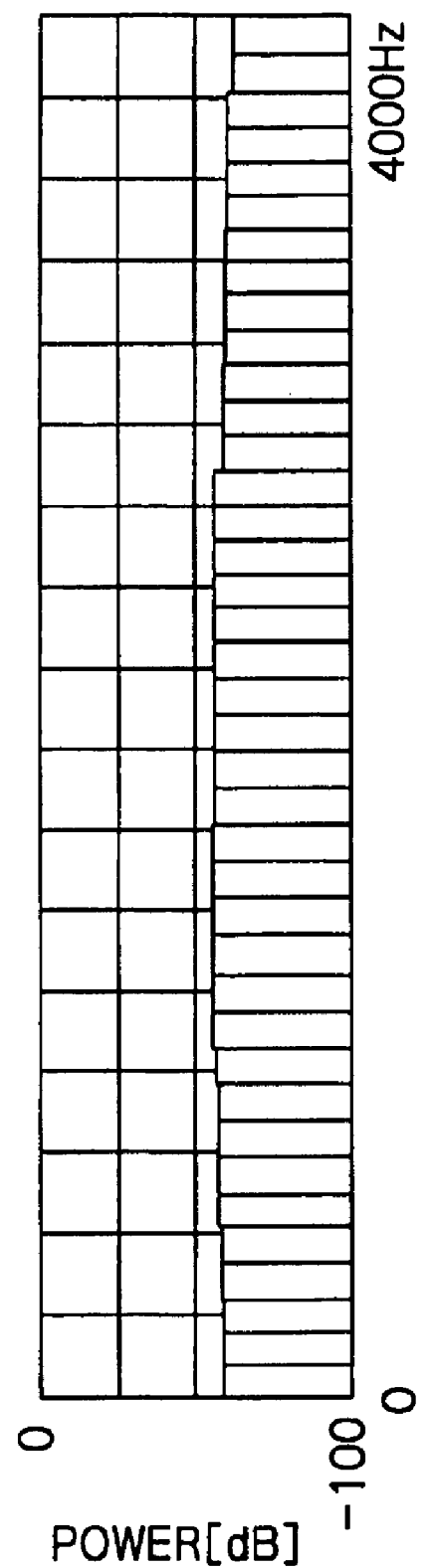
FIG. 8 is a graph of power spectral of the TSP with respect to its frequency.
Figure 9:
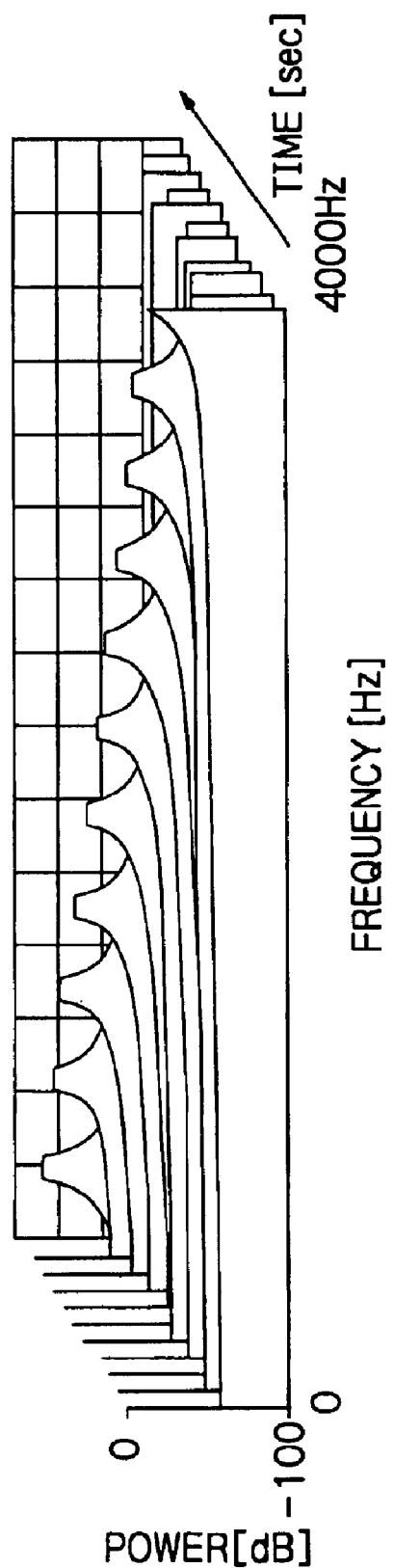
FIG. 9 is a graph of power spectral of the TSP with respect to its frequency and lapse of time.

FIG. 7 is a graph of power spectral of the TSP with respect to lapse of time. Such the TSP is disclosed for example in Yoichi Suzuki "Consideration about the design method of a time stretched pulse", Electronic-intelligence communication society, EA 92-86, pp. 17–24. Signal power of the TSP is large and all the frequency components in the communication band of the TSP have equal level. That is, the frequency component of the TSP shifts continuously with a lapse of time. FIG. 8 is a graph of power spectral of the TSP with respect to its frequency, and FIG. 9 is a graph of power spectral of the TSP with respect to its frequency and lapse of time. In the present invention, such the TSP with continuously varying frequency component, which is unaffected by noise, is used for evaluating quality-of-service in a packet switched network.

Figure 1:
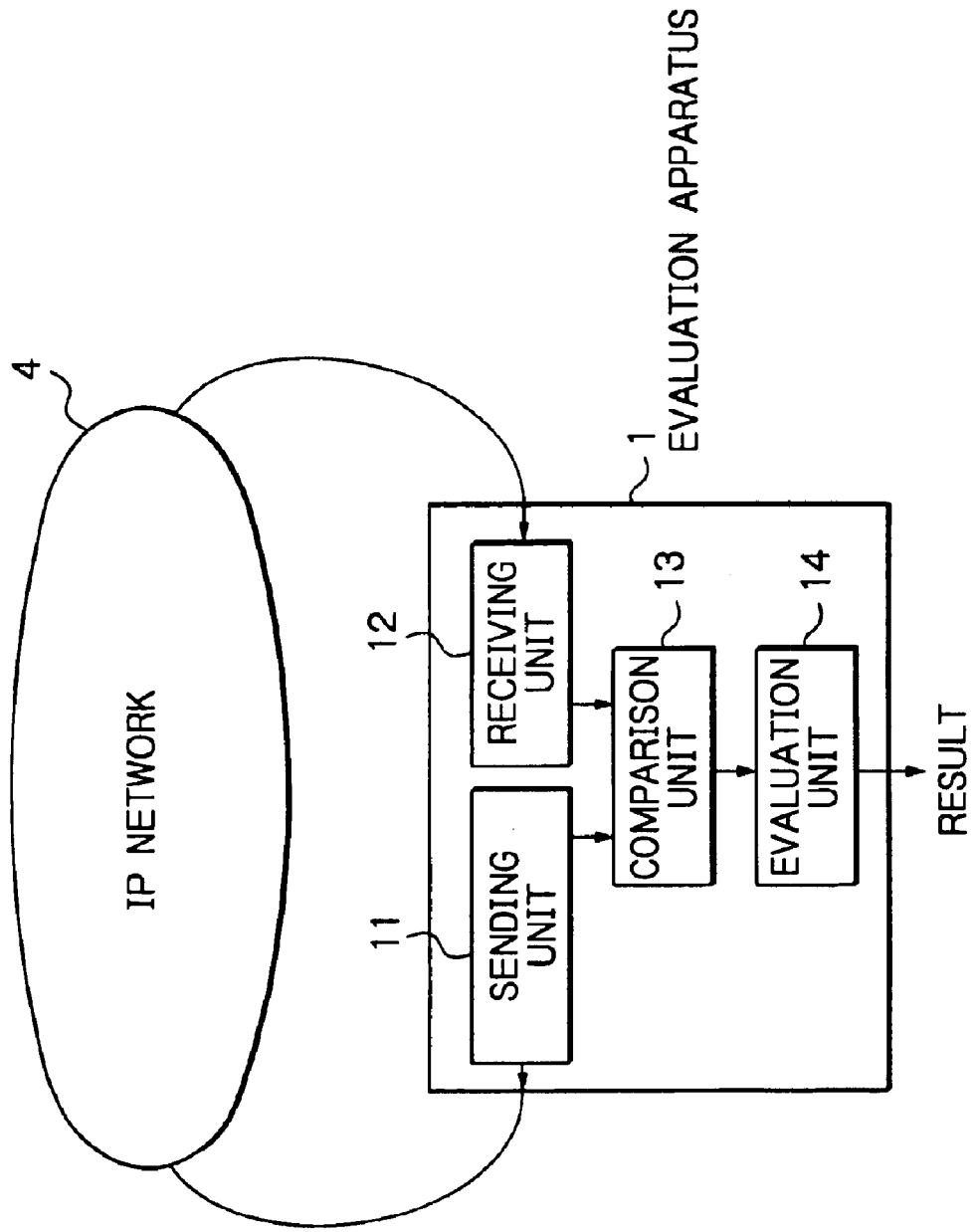
FIG. 1 is a block diagram of an apparatus for evaluating quality-of-service according to a preferred embodiment of the present invention.

FIG. 1 is a block diagram of a quality-of-service evaluation apparatus according to a preferred embodiment of the present invention. The quality-of-service evaluation apparatus 1 is connected so that a transmitted TSP signal can be received through an IP network 4. The evaluation apparatus 1 has a sending or transmission unit 11, a receiving unit 12, a comparison unit 13 and an evaluation unit 14.

The sending unit 11 transmits the TSP with a frequency component that continuously changes continuously with a lapse of time, to the IP network 4. The receiving unit 12 receives the TSP passed through the IP network 4. The comparing unit 13 compares the transmitted TSP with the received TSP to derive evaluation parameters. The evaluating unit 14 applies the derived evaluation parameters to the quality-of-service evaluation algorithm.

Figure 2:
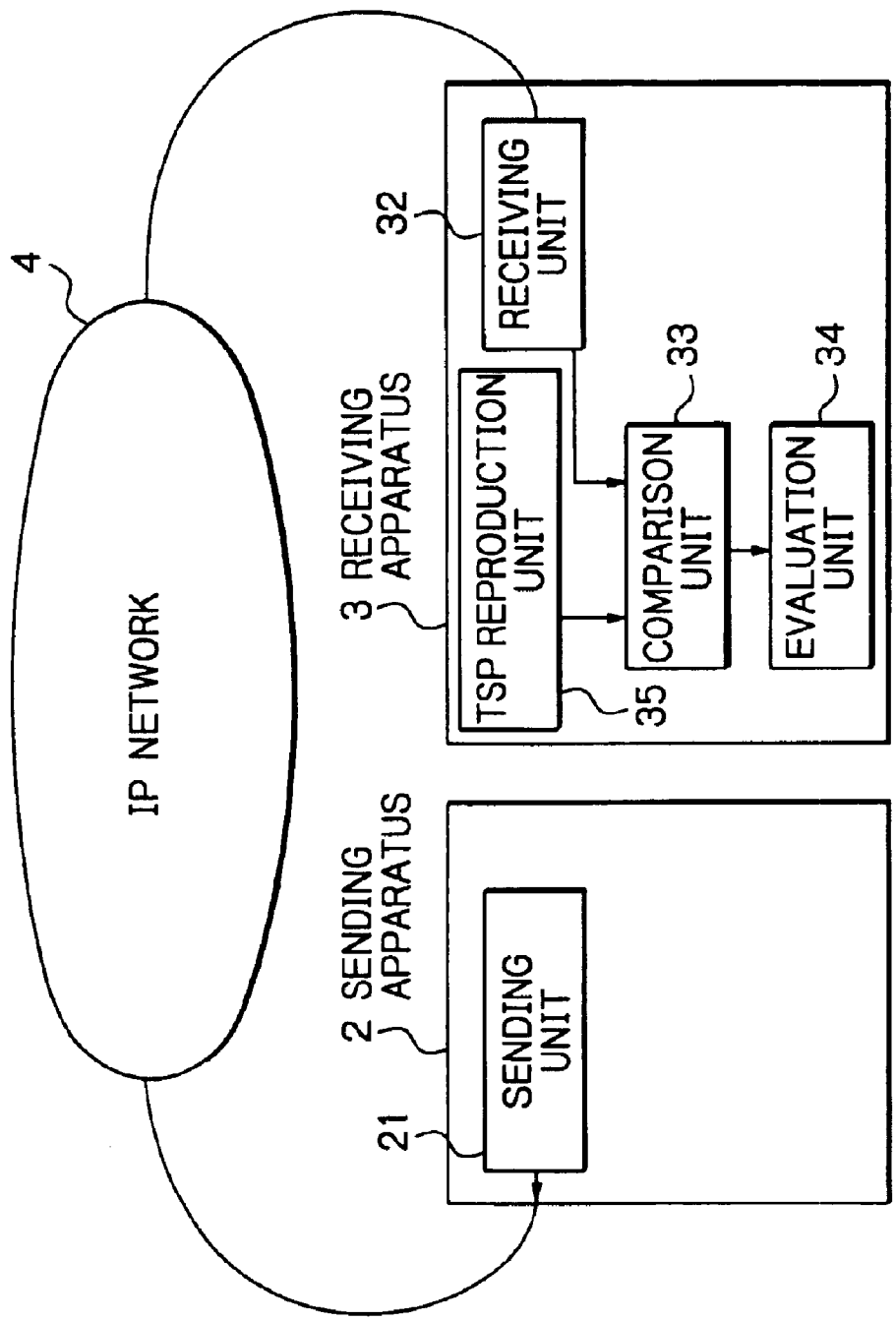
FIG. 2 is a block diagram of an apparatus for evaluating quality-of-service according to another embodiment of the present invention.

FIG. 2 is a block diagram of a quality-of-service evaluation apparatus according to another embodiment of the present invention. In this embodiment shown in FIG. 2, a sending unit 21 is separated from the evaluation function and located in a sending apparatus 2 whereas a receiving apparatus 3 has the evaluation function. Namely, the receiving apparatus 3 has a unit 32 for receiving the TSP, a unit 35 for reproducing the TSP recorded beforehand, a unit 33 for comparing the transmitted pulse with the received pulse and an evaluating unit 34. Therefore, in this embodiment, only the reception apparatus 3 can evaluate the quality-of-service of the IP network 4. The unit 35 records a TSP in PCM format previously, and thus can choose an appropriate sampling frequency corresponding to a time resolution in the measurement.

Figure 3:
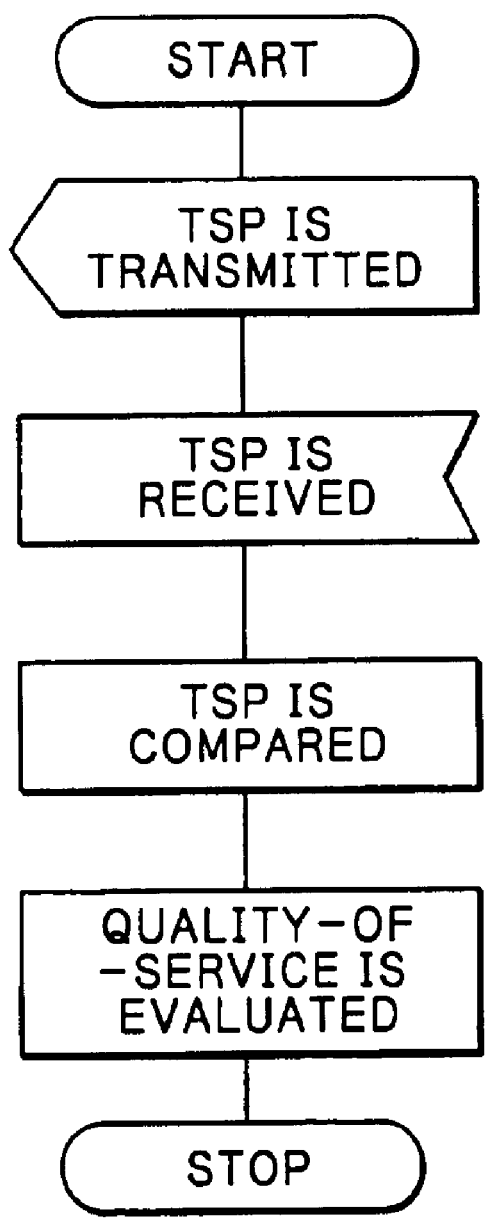
FIG. 3 is a flowchart illustrating a quality-of-service evaluation method according to the present invention.

FIG. 3 is a flowchart illustrating a quality-of-service evaluation method according to the present invention.

As shown in the figure, first, a TSP is transmitted to a communication system containing a packet switched network. Then, the TSP is received from the communication system and is recorded in a file. Thereafter, the file of the recorded TSP is opened, the average of all sampled data of the recorded TSP is calculated, and then differences between this calculated average and the respective sampled data of the recorded TSP are saved in another file. Then, the another file is opened, the data in the another file are cut down for every length corresponding to a desired time resolution, using a windowing function (Hamming windows, Blackman windows etc.). Then, a frequency component is calculated by executing a fast-Fourier-transform processing. The number of points of the fast-Fourier-transform executed can be suitably modified in consideration of the time resolution and a frequency resolution. A power spectrum ((real part)$^2$+ (imaginary part)$^2$) can be calculated from the calculated frequency component.

Then, the frequency power spectral of the transmitted TSP and that of the received TSP are compared with each other to obtain evaluation parameters such as a transmission delay, a transmission jitter, a discontinuous spacing of the frequency component corresponding to absence of packets or a pattern model generated by transmitted information loss, a transmitted information loss ratio and a ratio of transmitted signal power. Finally, a quality-of-service is evaluated by applying these evaluation parameters to a quality-of-service evaluation algorithm.

Further structures for connecting an IP network or IP networks and an evaluation apparatus may be constructed as follows. In these structures, monitoring of evaluation parameters will be performed after establishment of a telephone call, such as an existing telephone call or an IP telephone call, through the IP network.

Figure 4:
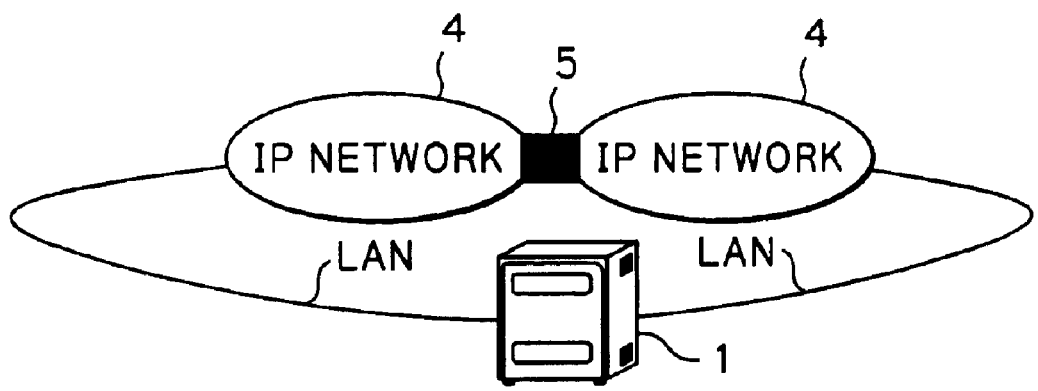
FIG. 4 illustrates a first example of a system for evaluating quality-of-service according to the present invention.

FIG. 4 illustrates a first example of a system for evaluating quality-of-service according to the present invention. In this example, two IP networks 4 are connected with each other through a network connection device 5 such as a bridge. According to this structure, the sum of the respective evaluation parameters of the two IP networks can be obtained. The evaluation apparatus 1 has originating and termination call functions for an IP telephone call and establishes a call between the two IP networks.

Figure 5:
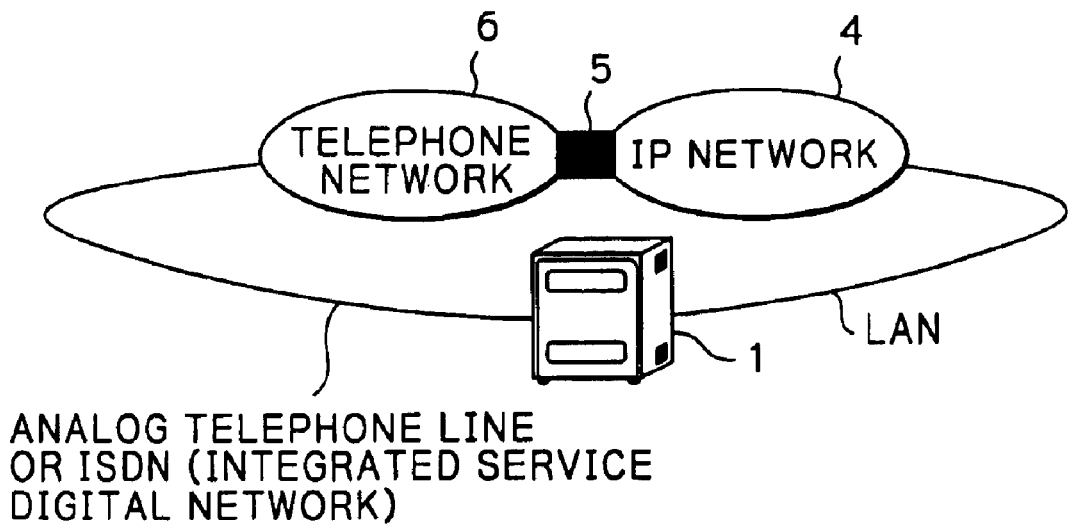
FIG. 5 illustrates a second example of a system for evaluating quality-of-service according to the present invention.

FIG. 5 illustrates a second example of a system for evaluating quality-of-service according to the present invention. In this example, an IP network 4 and a telephone network 6 are connected with each other through a network connection device 5. According to this structure, evaluation parameters of only the IP network can be obtained. The evaluation apparatus 1 has an originating call function for the telephone network 6 and a terminating call function for the IP network 4, and a call is established between the telephone network 6 and the IP network 4 by these functions. Thus, even if the telephone network exists in the communication system, since the TSP is unaffected by noises, only the quality-of-service of the IP network can be measured.

Figure 6:
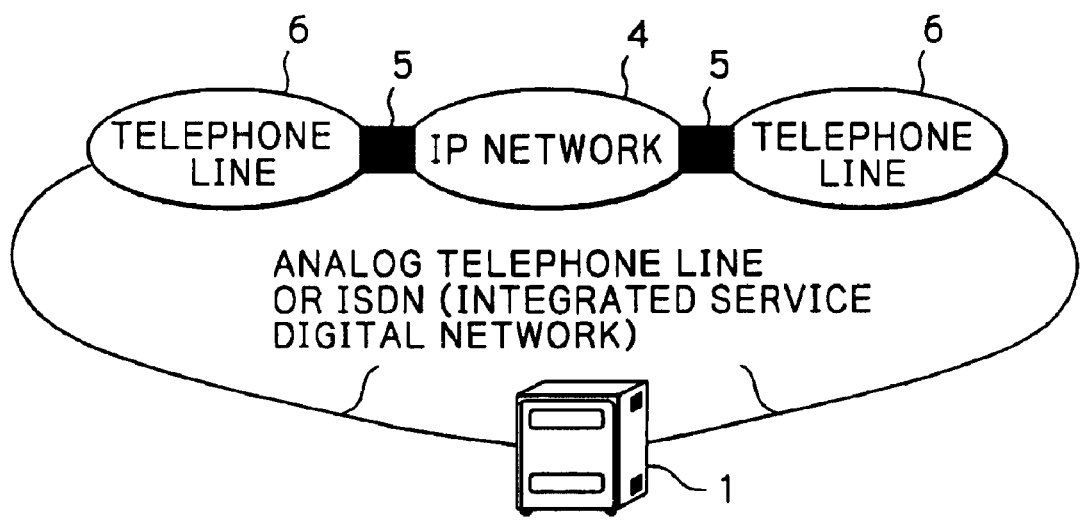
FIG. 6 illustrates a third example of a system for evaluating quality-of-service according to the present invention.

FIG. 6 illustrates a third example of a system for evaluating quality-of-service according to the present invention. In this example, telephone networks 6 and an IP network 4 are connected through a network connection devices 5 in as the telephone network 6—the IP network 4—the telephone network 6. According to this structure, evaluation parameters of only the IP network can be obtained. The evaluation apparatus 1 has an originating call function for the telephone network 6 and a terminating call function for the telephone network. Thus, a call is established between the telephone network, the IP network and the telephone network.

Figure 10:
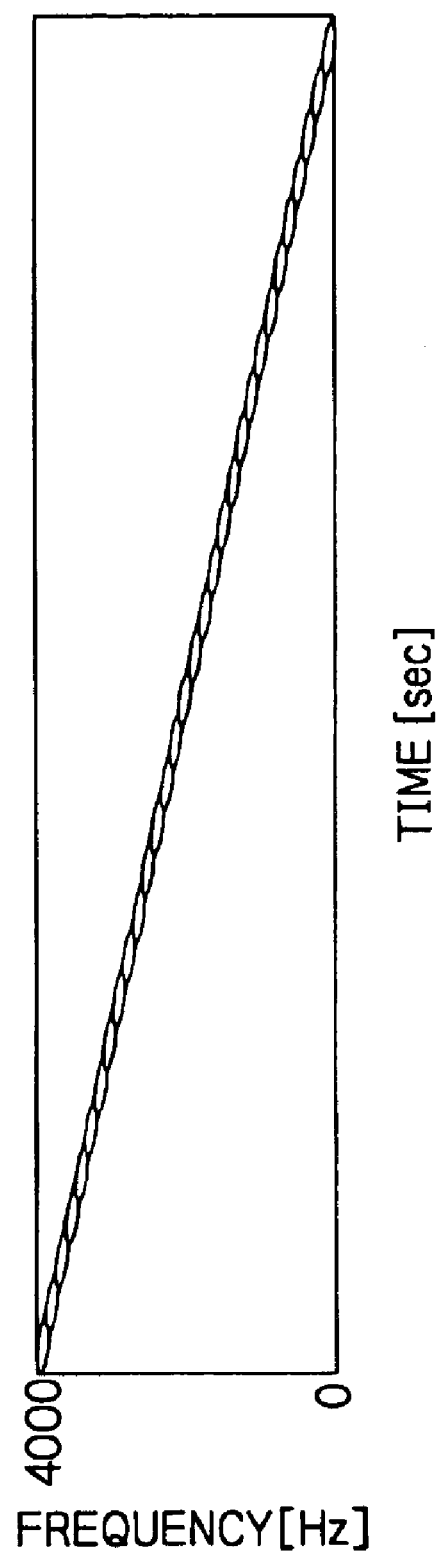
FIG. 10 is a graph of frequency component of the transmitted TSP with respect to lapse of time.

FIG. 10 is a graph of frequency component of the transmitted TSP with respect to lapse of time. The TSP is a PCM signal of 64 kbps ($\mu$-low), which is sampled by 8 kHz and quantized by 8 bits. The sampling frequency or the number of quantization bits of the TSP can be automatically or manually selected in accordance with the coding algorithm applied to the communication system to be evaluated.

Figure 11:
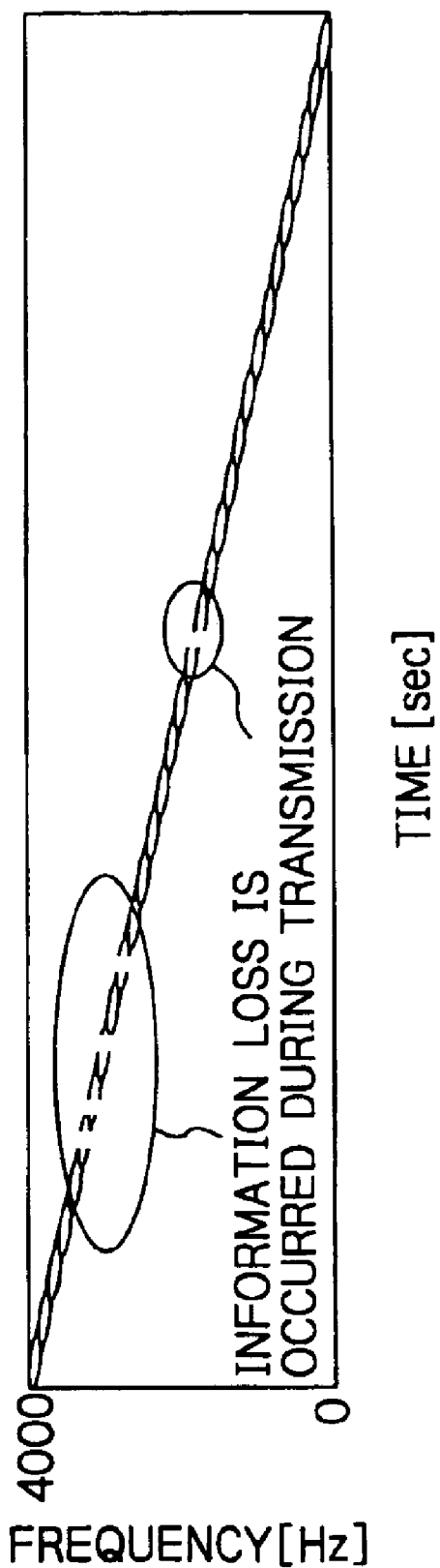
FIG. 11 is a graph of frequency component of the received TSP with respect to lapse of time.

FIG. 11 is a graph of frequency component of the received TSP with respect to lapse of time. This figure indicates that information losses may occur during transmission when the TSP shown in FIG. 10 is received through a packet switched network. Because the frequency component of the TSP shifts with a lapse of time, when absence of packets arises in the IP network, a frequency component loss will occur at the part of the packet absence. Therefore, by comparing the frequency component of the received TSP with that of the transmitted TSP to find parts of the frequency component loss and by counting the number of the frequency component loss parts, a transmitted information loss ratio can be calculated.

The resolution at the part of the frequency component loss can be freely adjusted by changing the number of points of the fast-Fourier-transform used for performing the frequency analysis of the signal.

Figure 12:
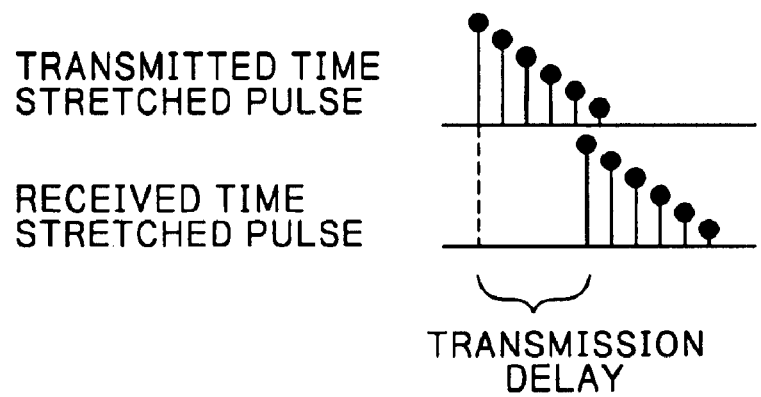
FIG. 12 schematically illustrates comparison between the transmitted TSP and the received TSP for obtaining a transmission delay.

FIG. 12 schematically illustrates comparison between the transmitted TSP and the received TSP for obtaining a transmission delay. The graph of frequency component of the transmitted TSP versus time is compared with the graph of frequency component of the received TSP versus time, and transmission delay time is calculated from the difference in time (the difference of the number of data samples).

Figure 13:
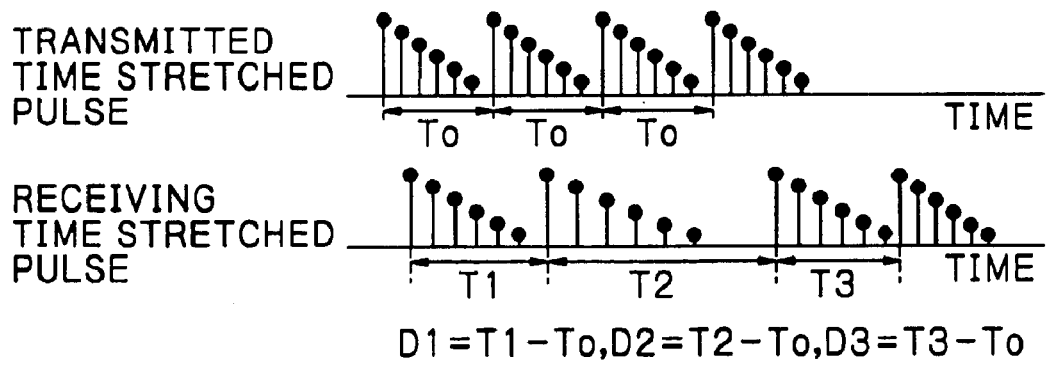
FIG. 13 schematically illustrates comparison between the transmitted TSP and the received TSP for obtaining a transmission jitter.

FIG. 13 schematically illustrates comparison between the transmitted TSP and the received TSP for obtaining a transmission jitter. The graph of frequency component of the transmitted TSP versus time is compared with the graph of frequency component of the received TSP versus time, and transmission jitter is calculated from the fluctuations of the interval of the transporting time of the signal.

Also, a ratio of transmitted signal power can be calculated by comparing the average of all the sampled data of the transmitted TSP with the average of all the sampled data of the received TSP.

The algorithm used is constituted by a plurality of condition judging formulas with comparing reference values (lower limits or upper limits) of the evaluation parameters and call setup-time parameters at the time of a call connecting. The algorithm may combine these condition judging formulas freely.

The evaluation parameters used for the judgment algorithm are as follows:
(1) reference value V11 V12: ringing/busy sound time
(2) reference value V21, V22: connection time
(3) reference value V31. V32: transmission delay
(4) reference value V41, V42: transmission jitter
(5) reference value V51, V52: ratio of transmitted signal power
(6) reference value V61, V62: transmitted information loss ratio
(7) reference value V71, V72, V73, pattern model of occurrence of transmitted information loss The example of the algorithm is as follows.
Algorithm 1 {
   (transmitted information loss ratio>V61) and
   (transmission delay>V31) and
   (V51<ratio of transmitted signal power<V52)
}
Algorithm 2 {
   ((transmitted information loss ratio>V61) and
   (transmission delay>V31) and
   (transmission jitter<V41)
)
or
(pattern model of occurrence of transmitted information loss=V71)
or
NOT(((V11<ringing/busy sound time<V12)
   and (V21<connection time<V22)))
}

According to the present invention, it is enabled to efficiently evaluate quality-of-service in an IP network. The apparatus according to the present invention does not need to be directly connected to the IP network.

In particular, since extraction and analysis of evaluation parameters are performed in a frequency component region, the present invention is rarely influenced of interference of noise or echo contained in a channel of a communication system to be evaluated in comparison with a case wherein the same process is performed in a wave shape region.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for evaluating qualify-of-service in packet switching network, said method using an evaluation signal with a frequency component that changes continuously with a lapse of time, wherein said evaluation signal is a time stretched pulse, and wherein said method comprises the steps of:

transmitting said time stretched pulse to at least one packet switching network;

receiving said time stretched pulse passed through said at least one packet switching network; and comprising said transmitted time stretched pulse with said received time stretched pulse, wherein said comparing step includes:

transforming said transmitted time stretched pulse and said received time stretched pulse respectively by a fast-Fourier-transform processing to extract time-frequency components; and comparing said time-frequency component of said transmitted time stretched pulse with said time-frequency component of said received time stretched pulse to calculate a transmission delay and a transmission jitter in the packet switched network.

2. A method as claimed in claim 1, wherein said comparing step includes:

calculating a discontinuous spacing corresponding to absence of packets, of said frequency component of said received time stretched pulse; and calculating a pattern model that is generated by transmitted information loss.

3. A method as claimed in claim 2, wherein said comparing step includes modifying a resolution of said fast-Fourier-transform processing in order to compute said discontinuous spacing of said frequency component.

4. A method as claimed in claim 2, wherein said comparing step includes calculating a rate of transmitted information loss from said pattern model.

5. A method as claimed in claim 1, wherein comprising a quality-of-service evaluation step that applies parameters measured by said comparing step to a quality-of-service evaluation algorithm.

6. An apparatus for evaluating quality-of-service in packet switching network, said apparatus using an evaluation signal with a frequency component that changes continuously with a lapse of time, wherein said evaluation signal is a time stretched pulse, and wherein said apparatus comprising:

means for transmitting said time stretched pulse to at least one packet switching network;

means for receiving said time stretched pulse passed through said at least one packet switching network; and means for comparing said transmitted time stretched pulse with said received time stretched pulse, wherein said comparing means includes:

means for transforming said transmitted time stretched pulse and said received time stretched pulse respectively by a fast-Fourier-transform processing to extract time-frequency components; and means for comparing said time-frequency component of said transmitted time stretched pulse with said time-frequency component of said received time stretched pulse to calculate a transmission delay and a transmission jitter in the packet switched network.

7. An apparatus as claimed in claim 6, wherein said comparing means includes:

means for calculating a discontinuous spacing corresponding to absence of packets, of said frequency component of said received time stretched pulse; and means for calculating a pattern model that is generated by said transmitted information loss.

8. An apparatus as claimed in claim 7, wherein said comparing means includes modifying a resolution of said fast-Fourier-transform processing in order to compute said discontinuous spacing of said frequency component.

9. An apparatus as claimed in claim 7, wherein said comparing means includes calculating a rate of transmitted information loss from said pattern model.

10. An apparatus as claimed 6, wherein comprising a quality-of-service evaluation means that applies parameters measured by said comparing means to a quality-of-service evaluation algorithm.

11. A system for evaluating quality-of-service in packet switching network, said system comprising:

an apparatus for transmitted time stretched pulse with a frequency component that changes continuously with a lapse of time, to at least one packet switching network; and an apparatus for generating said time stretched pulse recorded in memory, receiving said time stretched pulse passed through said at least one packet switching network, and comparing said regenerated time stretched pulse with said received time stretched pulse.

* * * * *